(12) United States Patent
Rallabhandi

(10) Patent No.: US 12,130,731 B2
(45) Date of Patent: Oct. 29, 2024

(54) SYSTEM AND METHOD FOR AUTOMATED TESTING OF SUITE OF APPLICATIONS

(71) Applicant: JPMorgan Chase Bank, N.A., New York, NY (US)

(72) Inventor: Anusha Rallabhandi, Hyderabad (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 175 days.

(21) Appl. No.: 17/984,927

(22) Filed: Nov. 10, 2022

(65) Prior Publication Data

US 2023/0176962 A1  Jun. 8, 2023

(30) Foreign Application Priority Data

Dec. 7, 2021 (IN) .............................. 202111056797

(51) Int. Cl.
G06F 11/36 (2006.01)

(52) U.S. Cl.
CPC ...... *G06F 11/3688* (2013.01); *G06F 11/3684* (2013.01)

(58) Field of Classification Search
USPC .......................................................... 717/124
See application file for complete search history.

(56) References Cited

U.S. PATENT DOCUMENTS

| | | | | |
|---|---|---|---|---|
| 2007/0168745 A1* | 7/2007 | Alam | .................. | G06F 11/3414 714/E11.193 |
| 2012/0210258 A1* | 8/2012 | Bykov | ...................... | G06F 8/38 715/764 |
| 2013/0246130 A1* | 9/2013 | Michel | .................. | G06F 16/252 707/769 |
| 2014/0109057 A1* | 4/2014 | Gibbens | .............. | G06F 11/3664 717/124 |
| 2014/0171017 A1* | 6/2014 | Menezes | ................ | H04M 15/58 455/406 |
| 2015/0020049 A1* | 1/2015 | Caufield | ............. | G06F 11/3684 717/124 |

(Continued)

*Primary Examiner* — Qing Chen
*Assistant Examiner* — Clint Thatcher
(74) *Attorney, Agent, or Firm* — GREENBLUM & BERNSTEIN, P.L.C.

(57) ABSTRACT

Various methods, apparatuses/systems, and media for automatically checking health of a certain component of an application are disclosed. A processor authenticates and authorizes a user to access an application dashboard based on verifying received input data of a user via a computing device with pre-stored credential data of the user; creates a configurable dashboard within the application's dashboard; feeds the configurable dashboard with data corresponding to functional flow diagram of an application and its dependent applications; feeds the configurable dashboard with test data and expected behavior for the test data in connection with testing the application; and selects a desired environment or a server on the configurable dashboard to test a particular code or functionality corresponding to the application and its dependent applications. The processor also traces, in response to selecting, the functional flow diagram of the application; and provides health check data indicating heath of all components of the application that are part of the functional flow diagram.

20 Claims, 8 Drawing Sheets

(56) References Cited

U.S. PATENT DOCUMENTS

| | | | |
|---|---|---|---|
| 2015/0143346 A1* | 5/2015 | Gurfinkel | G06F 11/3688 |
| | | | 717/131 |
| 2015/0370687 A1* | 12/2015 | Stein | G06F 11/3664 |
| | | | 717/124 |
| 2017/0060571 A1* | 3/2017 | Bruso | G06F 8/33 |
| 2021/0191845 A1* | 6/2021 | Bach | G06F 11/3688 |

* cited by examiner

SYSTEM AND METHOD FOR AUTOMATED TESTING OF SUITE OF APPLICATIONS

CROSS-REFERENCE TO RELATED APPLICATIONS

This application claims the benefit of priority from Indian Patent Application No. 202111056797, filed Dec. 7, 2021, which is herein incorporated by reference in its entirety.

TECHNICAL FIELD

This disclosure generally relates to application development and testing of application, and, more particularly, to methods and apparatuses for implementing a platform and language agnostic application module for creating a dashboard within a dashboard configured for automating development and testing of suite of applications.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Application development and testing in the internet era has grown increasingly complex. Software applications must not only handle and process complex calculations and tasks, but must be able to accurately and efficiently process a large variety of data types and data content. As software application becomes increasingly more complex, development, test, release, and management of such software application also become more complex as a large number of unique combinations of paths and modules may be tested, released, and managed for each software application. Conventional tools exist for developing, testing and releasing application which generally require a significant amount of manual effort. Automation is an important aspect in any application development, test, and maintenance and at the same time it is also time consuming to write scripts and maintain those.

For example, while performing integration testing of an application in a conventional tool, the following may be the usual problems faced by a user: testing of multiple other applications, some of which a user may not be aware that it would be part of the impacted applications for a change made; lack of expertise on end-to-end functional flows or edge case scenarios to be tested; not enough knowledge on business constraints or conditions against which a functionality needs to be tested; numerous manual efforts for regression testing; restricted access to dependent testing tools utilized by an organization; lack of expertise on right suite of test files to be used to test a specific functional flow, etc. In addition, a user might not be aware of all the possible scenarios, or even if a user is aware of the business and functional domains, there may be a scope for human errors. For example, missing testing of a specific functional flow related to the change made or edge case scenarios; missing testing of an impacted application as user might not be aware that the change made impacts a particular flow in another application; testing with incorrect files or in incorrect procedure due to lack of expertise, etc.

Thus, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic application module/tool/framework for creating a dashboard within a dashboard configured for automating development and testing of suite of applications, but the disclosure is not limited thereto.

For example, the various aspects, embodiments, features, and/or sub-components may also provide optimized processes of implementing a platform and language agnostic application module/tool/framework for creating a dashboard within a dashboard configured for: providing an end-to-end functional flow of an application even before development which would avoid potential bugs; providing information data related to the information on clients or modules or components that would be impacted when a piece of functionality is updated or added in a module within an application helping in testing of the impacted applications; providing a transparent process where input provided to the module, health check of the module, outcome obtained from the module would all be mentioned, thereby helping in faster identification of potential bugs if any issues arise; automating the development and testing processes, etc., but the disclosure is not limited thereto.

According to an aspect of the present disclosure, a method for checking health of a certain component of an application by utilizing one or more processors and one or more memories is disclosed. The method may include: receiving input data from a user requesting access to an application dashboard; authenticating and authorizing the user to access the application dashboard based on verifying the received input data of the user with pre-stored credential data of the user; creating a configurable dashboard within the application's dashboard; feeding the configurable dashboard with data corresponding to functional flow diagram of an application and its dependent applications; feeding the configurable dashboard with test data and expected behavior for the test data in connection with testing the application; selecting a desired environment or a server on the configurable dashboard to test a particular code or functionality corresponding to the application and its dependent applications; tracing, in response to selecting, the functional flow diagram of the application; and providing health check data indicating heath of all components of the application that are part of the functional flow diagram.

According to yet another aspect of the instant disclosure, the method may include automatically testing each component of the application based on the test data and the functional flow diagram.

According to a further aspect of the instant disclosure, wherein the dependent applications are external dependent applications external to the application dashboard with respect to the application, but the disclosure is not limited thereto.

According to an additional aspect of the present disclosure, the method may further include: receiving user input corresponding to application name, environments, platform, server, and application owner via the application dashboard; displaying a create module button onto a graphical user interface; and automatically creating modules or components within the application when pressing signal on the create module button is received.

According to yet another aspect of the instant disclosure, the method may include displaying expected output and health check uniform resource locators of the modules or components onto the graphical user interface.

According to a further aspect of the instant disclosure, the method may include displaying, onto a graphical user interface, corresponding fields to receive user input corresponding to details related to external client application information which have dependencies with the created applications or modules or components.

According to a further aspect of the instant disclosure, the method may include: displaying, onto a graphical user interface, frequently asked questions that include general and user asked questions where a discussion thread is maintained till the user who asked the question determines that the question has been answered and marks the question as closed.

According to another aspect of the instant disclosure, a system for checking health of a certain component of an application is disclosed. The system may include: a processor; and a memory operatively connected to the processor via a communication interface, the memory storing computer readable instructions, when executed, may cause the processor to: receive input data from a user requesting access to an application dashboard; authenticate and authorize the user to access the application dashboard based on verifying the received input data of the user with pre-stored credential data of the user; create a configurable dashboard within the application's dashboard; feed the configurable dashboard with data corresponding to functional flow diagram of an application and its dependent applications; feed the configurable dashboard with test data and expected behavior for the test data in connection with testing the application; select a desired environment or a server on the configurable dashboard to test a particular code or functionality corresponding to the application and its dependent applications; trace, in response to selecting, the functional flow diagram of the application; and provide health check data indicating heath of all components of the application that are part of the functional flow diagram.

According to a further aspect of the instant disclosure, the processor may be further configured to automatically test each component of the application based on the test data and the functional flow diagram.

According to another aspect of the instant disclosure, the processor may be further configured to: receive user input corresponding to application name, environments, platform, server, and application owner via the application dashboard; display a create module button onto a graphical user interface; and automatically create modules or components within the application when pressing signal on the create module button is received.

According to yet another aspect of the instant disclosure, the processor may be further configured to display expected output and health check uniform resource locators of the modules or components onto the graphical user interface.

According to an additional aspect of the instant disclosure, the processor may be further configured to display, onto a graphical user interface, corresponding fields to receive user input corresponding to details related to external client application information which have dependencies with the created applications or modules or components.

According to a further aspect of the instant disclosure, the processor may be further configured to: display, onto a graphical user interface, frequently asked questions that include general and user asked questions where a discussion thread is maintained till the user who asked the question determines that the question has been answered and marks the question as closed.

According to yet another aspect of the present disclosure, a non-transitory computer readable medium configured to store instructions for automatically fixing health of a certain component of an application is disclosed. The instructions, when executed, may cause a processor to perform the following: receiving input data from a user requesting access to an application dashboard; authenticating and authorizing the user to access the application dashboard based on verifying the received input data of the user with pre-stored credential data of the user; creating a configurable dashboard within the application's dashboard; feeding the configurable dashboard with data corresponding to functional flow diagram of an application and its dependent applications; feeding the configurable dashboard with test data and expected behavior for the test data in connection with testing the application; selecting a desired environment or a server on the configurable dashboard to test a particular code or functionality corresponding to the application and its dependent applications; tracing, in response to selecting, the functional flow diagram of the application; and providing health check data indicating heath of all components of the application that are part of the functional flow diagram.

According to another aspect of the instant disclosure, the instructions, when executed, may further cause the processor to perform the following: automatically testing each component of the application based on the test data and the functional flow diagram.

According to an additional aspect of the present disclosure, the instructions, when executed, may further cause the processor to perform the following: receiving user input corresponding to application name, environments, platform, server, and application owner via the application dashboard; displaying a create module button onto a graphical user interface; and automatically creating modules or components within the application when pressing signal on the create module button is received.

According to yet another aspect of the instant disclosure, the instructions, when executed, may further cause the processor to perform the following: displaying expected output and health check uniform resource locators of the modules or components onto the graphical user interface.

According to a further aspect of the instant disclosure, the instructions, when executed, may further cause the processor to perform the following: displaying, onto a graphical user interface, corresponding fields to receive user input corresponding to details related to external client application information which have dependencies with the created applications or modules or components.

According to an additional aspect of the instant disclosure, the instructions, when executed, may further cause the processor to perform the following: displaying, onto a graphical user interface, frequently asked questions that include general and user asked questions where a discussion thread is maintained till the user who asked the question determines that the question has been answered and marks the question as closed.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
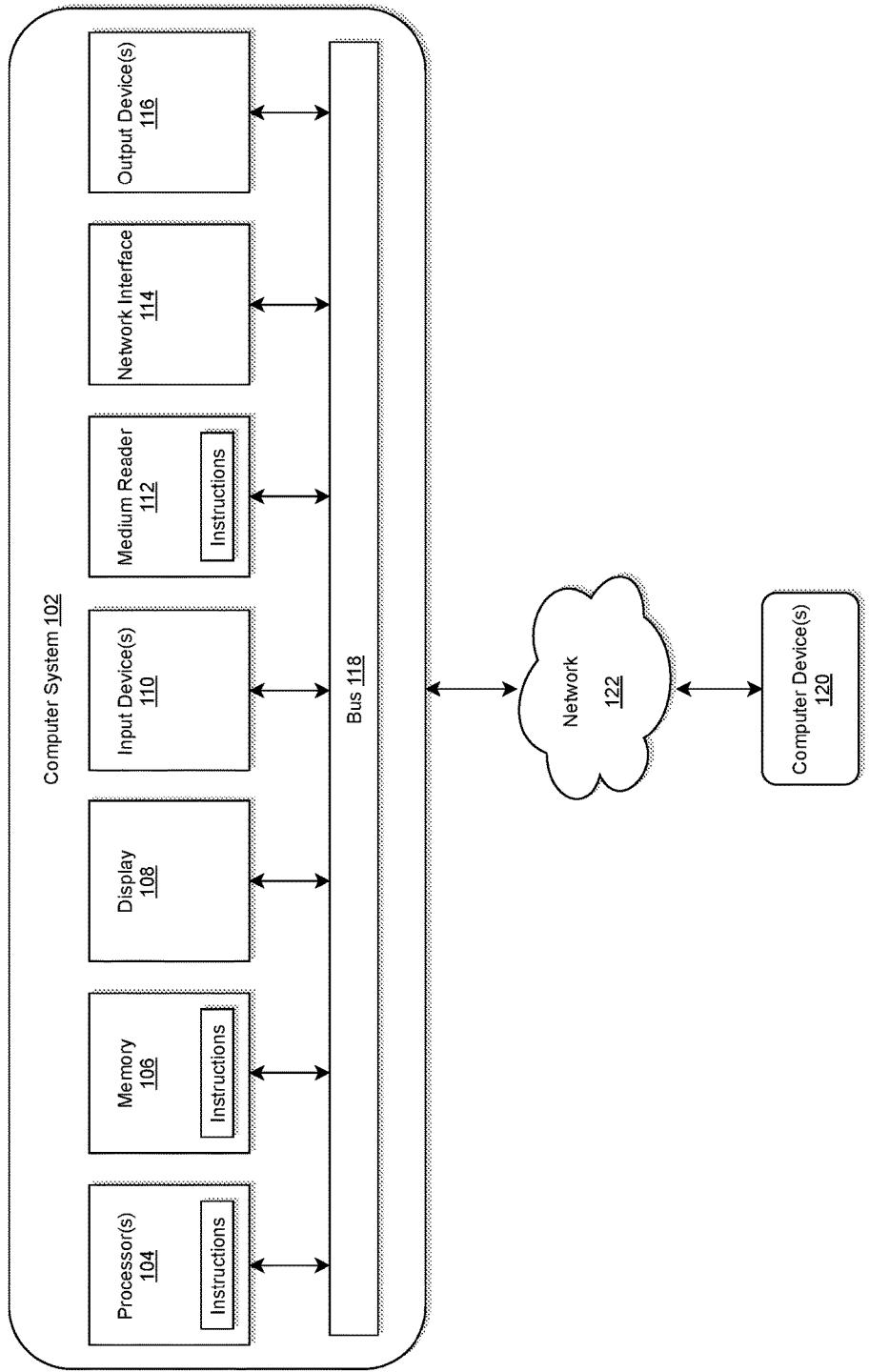
FIG. 1 illustrates a computer system for implementing a platform and language agnostic application module/tool/ framework for creating a dashboard within a dashboard configured for automating development and testing of suite of applications in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a platform and language agnostic resiliency module for creating a workflow-based plug and play framework configured for assisting all applications with automatic execution of scripts to aid in failover process in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

According to exemplary embodiments, the platform and language agnostic application module/tool/framework allows for consistent easy orchestration and passing of data through various components to output a desired result in an automated fashion. Since the disclosed process, according to exemplary embodiments, is platform and language agnostic, the application module/tool/framework may be independently tuned or modified for optimal performance without affecting the configuration/data files. The configuration/data files, according to exemplary embodiments, may be written using JSON, but the disclosure is not limited thereto. For example, the configuration/data files can easily be extended to other readable file formats such as XML, YAML, etc., or any other configuration based languages.

Figure 2:
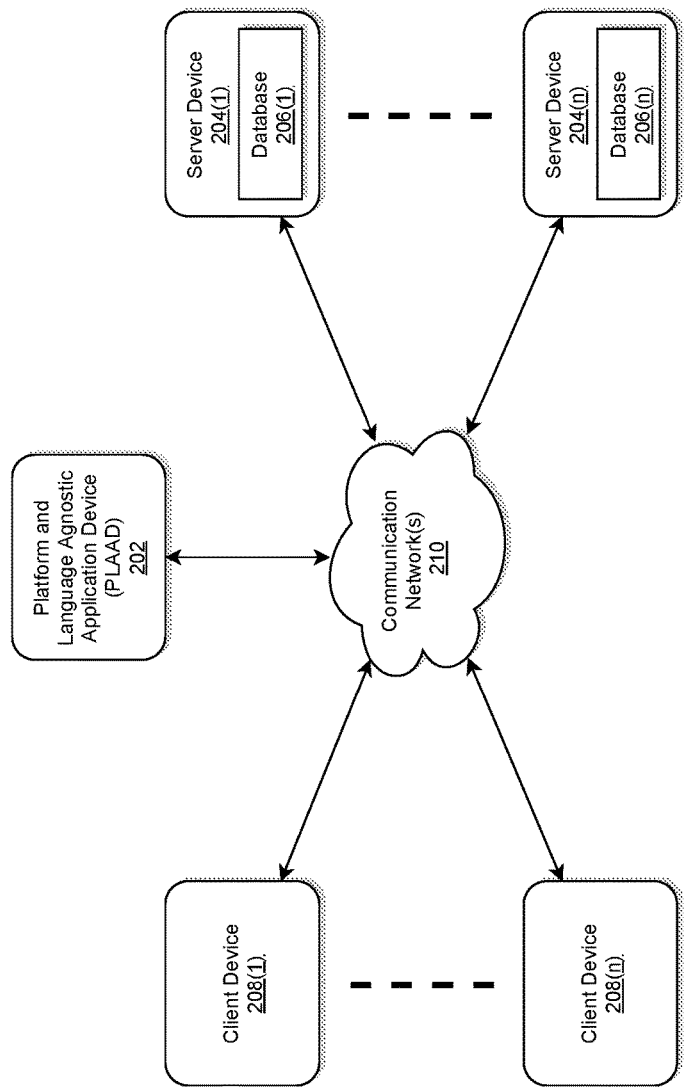
FIG. 2 illustrates an exemplary diagram of a network environment with a platform and language agnostic application device in accordance with an exemplary embodiment.

Referring to FIG. 2, a schematic of an exemplary network environment 200 for implementing a platform and language agnostic application device (PLAAD) of the instant disclosure is illustrated.

According to exemplary embodiments, the above-described problems associated with conventional approach of developing, testing, or managing software application may be overcome by implementing a PLAAD 202 as illustrated in FIG. 2 that may create a dashboard within a dashboard configured for automating development and testing of suite of applications, but the disclosure is not limited thereto. For example, the PLAAD 202 may also provide optimized processes for creating a dashboard within a dashboard configured for: providing an end-to-end functional flow of an application even before development which would avoid potential bugs; providing information data related to the information on clients or modules or components that would be impacted when a piece of functionality is updated or added in a module within an application helping in testing of the impacted applications; providing a transparent process where input provided to the module, health check of the module, outcome obtained from the module would all be mentioned, thereby helping in faster identification of potential bugs if any issues arise; automating the development and testing processes, etc., but the disclosure is not limited thereto.

The PLAAD 202 may be the same or similar to the computer system 102 as described with respect to FIG. 1.

The PLAAD 202 may store one or more applications that can include executable instructions that, when executed by the PLAAD 202, cause the PLAAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PLAAD 202 itself, may be located in virtual server(s) running in a cloud-based computing environment rather than being tied to one or more specific physical network computing devices. Also, the application(s) may be running in one or more virtual machines (VMs) executing on the PLAAD 202. Additionally, in one or more embodiments of this technology, virtual machine(s) running on the PLAAD 202 may be managed or supervised by a hypervisor.

In the network environment 200 of FIG. 2, the PLAAD 202 is coupled to a plurality of server devices 204(1)-204(n) that hosts a plurality of databases 206(1)-206(n), and also to a plurality of client devices 208(1)-208(n) via communication network(s) 210. A communication interface of the PLAAD 202, such as the network interface 114 of the computer system 102 of FIG. 1, operatively couples and communicates between the PLAAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PLAAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PLAAD 202 may be a standalone device or integrated with one or more other devices or apparatuses, such as one or more of the server devices 204(1)-204(n), for example. In one particular example, the PLAAD 202 may be hosted by one of the server devices 204(1)-204(n), and other arrangements are also possible. Moreover, one or more of the devices of the PLAAD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PLAAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the PLAAD 202 that may efficiently provide a platform for creating a dashboard within a dashboard configured for automating development and testing of suite of applications, but the disclosure is not limited thereto. For example, the client devices 208(1)-208(n) in this example may include any type of computing device that can facilitate the implementation of the PLAAD 202 that may be configured for creating a dashboard within a dashboard configured for: providing an end-to-end functional flow of an application even before development which would avoid potential bugs; providing information data related to the information on clients or modules or components that would be impacted when a piece of functionality is updated or added in a module within an application helping in testing of the impacted applications; providing a transparent process where input provided to the module, health check of the module, outcome obtained from the module would all be mentioned, thereby helping in faster identification of potential bugs if any issues arise; automating the development and testing processes, etc., but the disclosure is not limited thereto.

The client devices 208(1)-208(n) may run interface applications, such as standard web browsers or standalone client applications, which may provide an interface to communicate with the PLAAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the PLAAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PLAAD 202, the server devices 204(1)-204(n), or the client devices 208(1)-208(n), for example, may be configured to operate as virtual instances on the same physical machine. For example, one or more of the PLAAD 202, the server devices 204(1)-204(n), or the client devices 208(1)-208(n) may operate on the same physical device rather than as separate devices communicating through communication network(s) 210. Additionally, there may be more or fewer PLAADs 202, server devices 204(1)-204(n), or client devices 208(1)-208(n) than illustrated in FIG. 2. According to exemplary embodiments, the PLAAD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
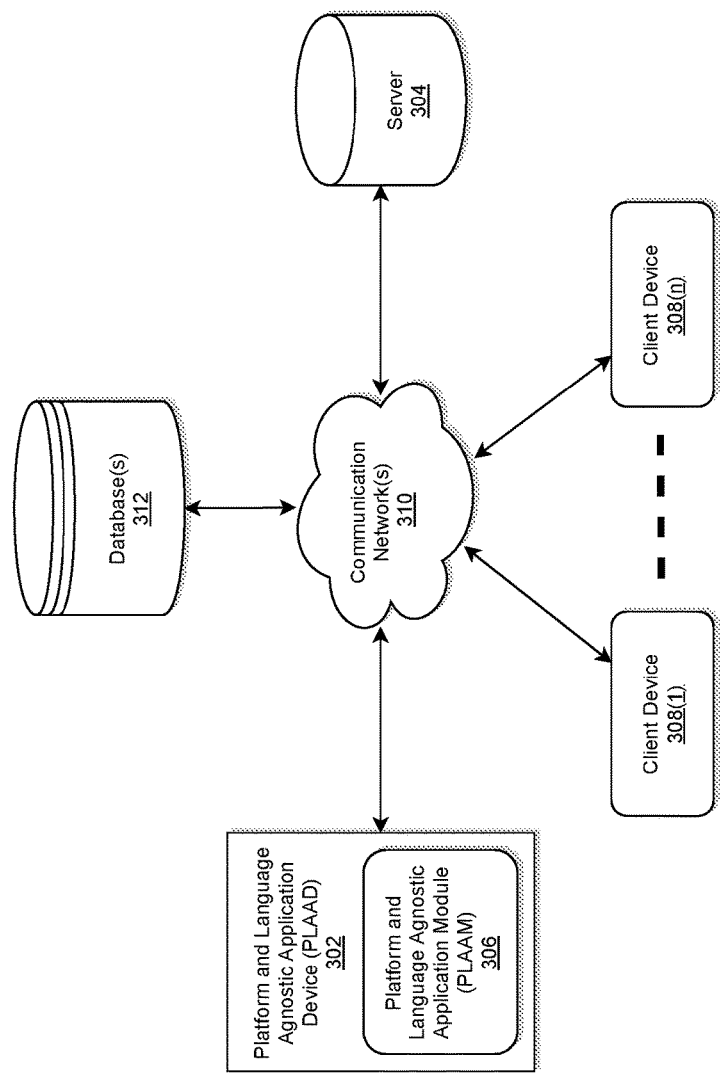
FIG. 3 illustrates a system diagram for implementing a platform and language agnostic application device having a platform and language agnostic application module in accordance with an exemplary embodiment.

FIG. 3 illustrates a system diagram for implementing a platform and language agnostic application device (PLAAD) having a platform and language agnostic application module (PLAAM) in accordance with an exemplary embodiment.

As illustrated in FIG. 3, the system 300 may include a PLAAD 302 within which a PLAAM 306 is embedded, a server 304, a database(s) 312, a plurality of client devices 308(1) . . . 308(n), and a communication network 310.

According to exemplary embodiments, the PLAAD 302 including the PLAAM 306 may be connected to the server 304, and the database(s) 312 via the communication network 310. The PLAAD 302 may also be connected to the plurality of client devices 308(1) . . . 308(n) via the communication network 310, but the disclosure is not limited thereto.

According to exemplary embodiment, the PLAAD 302 is described and shown in FIG. 3 as including the PLAAM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein.

According to exemplary embodiments, the PLAAM 306 may be configured to receive real-time feed of data from the plurality of client devices 308(1) . . . 308(n) via the communication network 310.

As will be described below, the PLAAM 306 may be configured to receive input data from a user via client devices 308(1) . . . 308(n) requesting access to an application dashboard; authenticate and authorize the user to access the application dashboard based on verifying the received input data of the user with pre-stored credential data of the user stored on database(s) 312; create a configurable dashboard within the application's dashboard; feed the configurable dashboard with data corresponding to functional flow diagram of an application and its dependent applications; feed the configurable dashboard with test data and expected behavior for the test data in connection with testing the application; select a desired environment or a server on the configurable dashboard to test a particular code or functionality corresponding to the application and its dependent applications; trace, in response to selecting, the functional flow diagram of the application; and provide health check data indicating heath of all components of the application that are part of the functional flow diagram, but the disclosure is not limited thereto.

The plurality of client devices 308(1) . . . 308(n) are illustrated as being in communication with the PLAAD 302. In this regard, the plurality of client devices 308(1) . . . 308(n) may be "clients" of the PLAAD 302 and are described herein as such. Nevertheless, it is to be known and understood that the plurality of client devices 308(1) . . . 308(n) need not necessarily be "clients" of the PLAAD 302, or any entity described in association therewith herein. Any additional or alternative relationship may exist between either or both of the plurality of client devices 308(1) . . . 308(n) and the PLAAD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the PLAAD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The PLAAD 302 may be the same or similar to the PLAAD 202 as described with respect to FIG. 2, including any features or combination of features described with respect thereto.

Figure 4:
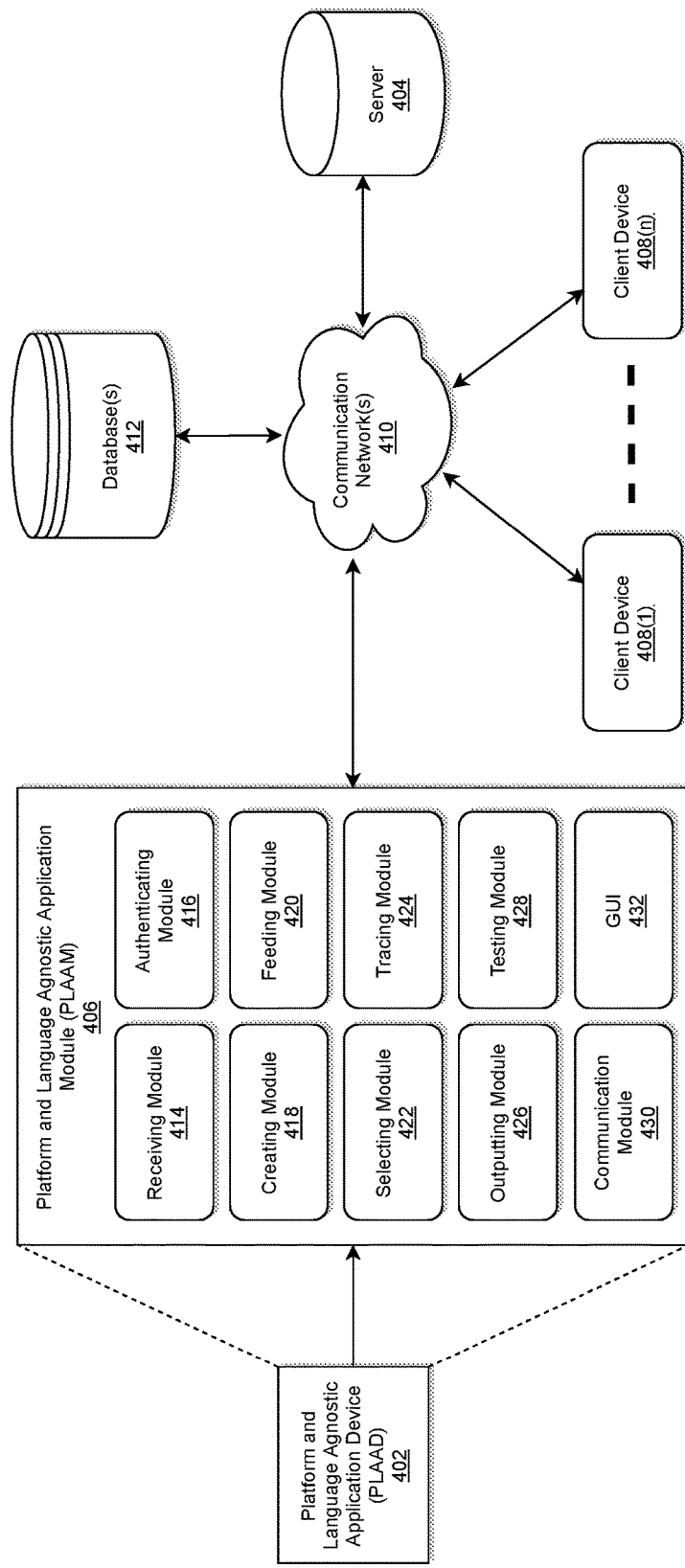
FIG. 4 illustrates a system diagram for implementing a platform and language agnostic application module of FIG. 3 in accordance with an exemplary embodiment.

FIG. 4 illustrates a system diagram for implementing a platform and language agnostic application module (PLAAM) of FIG. 3 in accordance with an exemplary embodiment.

According to exemplary embodiments, the system 400 may include a platform and language agnostic application device (PLAAD) 402 within which a PLAAM 406 is embedded, a server 404, database(s) 412, and a communication network 410.

According to exemplary embodiments, the PLAAD 402 including the PLAAM 406 may be connected to the server 404 and the database(s) 412 via the communication network 410. The PLAAD 402 may also be connected to the plurality of client devices 408(1)-408(n) via the communication network 410, but the disclosure is not limited thereto. The PLAAM 406, the server 404, the plurality of client devices 408(1)-408(n), the database(s) 412, the communication network 410 as illustrated in FIG. 4 may be the same or similar to the PLAAM 306, the server 304, the plurality of client devices 308(1)-308(n), the database(s) 312, the communication network 310, respectively, as illustrated in FIG. 3.

According to exemplary embodiments, as illustrated in FIG. 4, the PLAAM 406 may include a receiving module 414, an authenticating module 416, a creating module 418, a feeding module 420, a selecting module 422, a tracing module 424, an outputting module 426, a testing module 428, a communication module 430, and a GUI 432.

According to exemplary embodiments, each of the receiving module 414, authenticating module 416, creating module 418, feeding module 420, selecting module 422, tracing module 424, outputting module 426, testing module 428, and the communication module 430 of the PLAAM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, authenticating module 416, creating module 418, feeding module 420, selecting module 422, tracing module 424, outputting module 426, testing module 428, and the communication module 430 the PLAAM 406 may be implemented by microprocessors or similar, and may be programmed using software (e.g., microcode) to perform various functions discussed herein and may optionally be driven by firmware and/or software.

Alternatively, according to exemplary embodiments, each of the receiving module 414, authenticating module 416, creating module 418, feeding module 420, selecting module 422, tracing module 424, outputting module 426, testing module 428, and the communication module 430 of the PLAAM 406 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, authenticating module 416, creating module 418, feeding module 420, selecting module 422, tracing module 424, outputting module 426, testing module 428, and the communication module 430 PLAAM 406 may be called via corresponding API.

Figure 5:
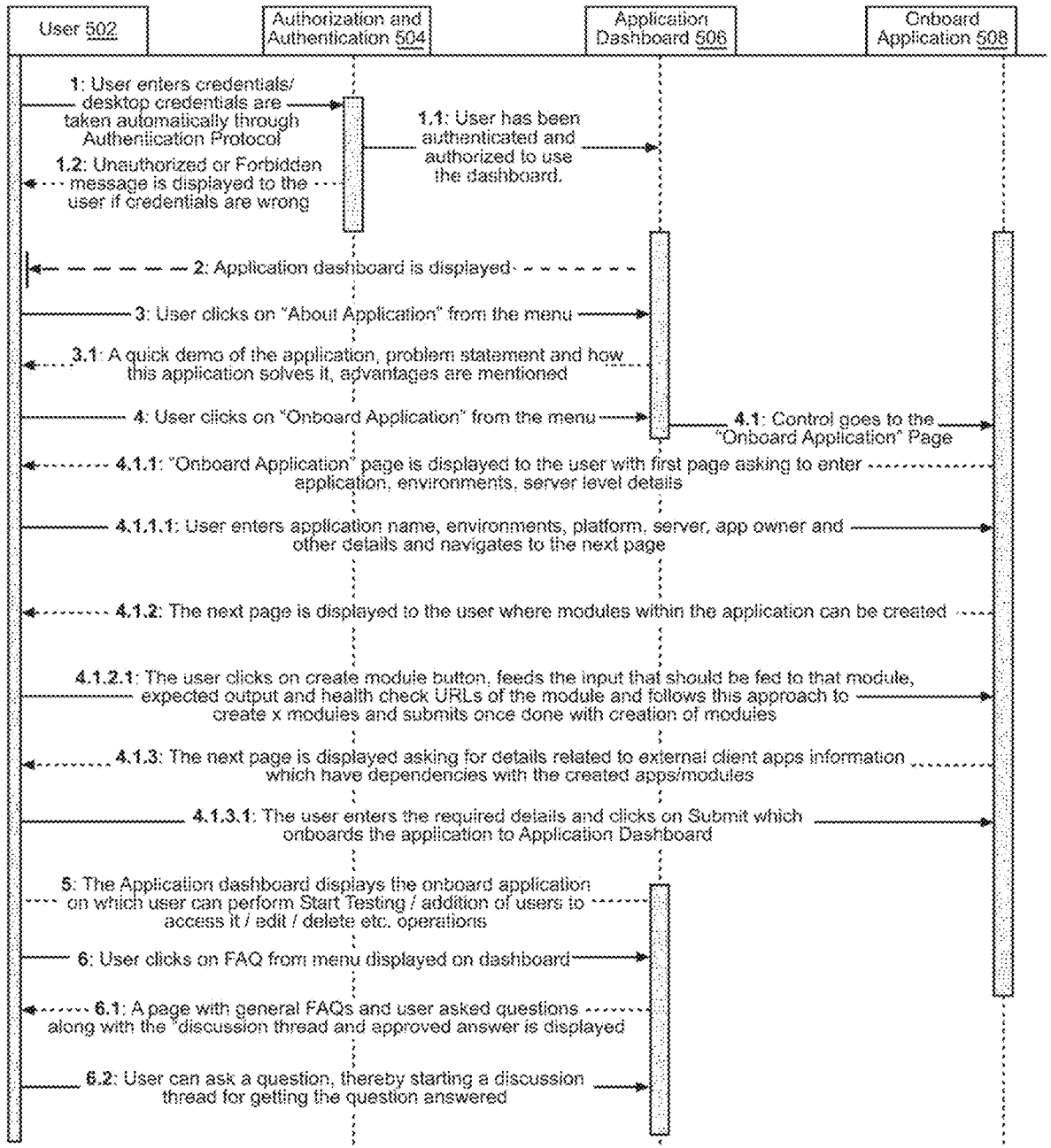
FIG. 5 illustrates an exemplary sequence diagram implemented by the platform and language agnostic application module of FIG. 4 in accordance with an exemplary embodiment.

FIG. 5 illustrates an exemplary sequence diagram 500 implemented by the PLAAM 406 of FIG. 4 in accordance with an exemplary embodiment.

The process may be executed via the communication module 430 and the communication network 410, which may comprise plural networks as described above. For example, in an exemplary embodiment, the various components of the PLAAM 406, 506 may communicate with the server 404, and the database(s) 412 via the communication module 430 and the communication network 410. Of course, these embodiments are merely exemplary and are not limiting or exhaustive.

According to exemplary embodiments, the communication network 410 and the communication module 430 may be configured to establish a link between the database(s) 412, the client devices 408(1)-408(n) and the PLAAM 406, 506.

Referring to FIGS. 4 and 5, according to exemplary embodiments, the receiving module 414 may be configured to receive input data from a user 502 requesting access to an application dashboard 506. The authenticating module 416 (i.e., authentication and authorization block 504) of the PLAAM 406 may be configured to authenticate and authorize the user 502 to access the application dashboard 506 based on verifying the received input data of the user 502 with pre-stored credential data of the user 502 stored onto the database(s) 412.

According to exemplary embodiments, the creating module 418 may be configured to create a configurable dashboard within the application's dashboard 506. The feeding module 420 may be configured to feed the configurable dashboard with data corresponding to functional flow diagram of an application and its dependent applications. The feeding module 420 may further be configured to feed the configurable dashboard with test data and expected behavior for the test data in connection with testing the application.

According to exemplary embodiments, the selecting module 422 may be configured to select a desired environment or a server (i.e., server 404) on the configurable dashboard to test a particular code or functionality corresponding to the application and its dependent applications.

According to exemplary embodiments, the tracing module 424 may be configured to trace, in response to selecting, the functional flow diagram of the application. The outputting module 426 may be configured to provide health check data on the GUI 432 indicating heath of all components of the application that are part of the functional flow diagram.

According to exemplary embodiments, the testing module 428 may be configured to automatically test each component of the application based on the test data and the functional flow diagram.

Referring back to FIGS. 4 and 5, for example, as illustrated in the sequence diagram 500 implemented by the PLAAM 406, at sequence 1, the user 502 may enter credentials data for authorization and authentication 504. Alternatively, desktop credentials data of the user 502 may be taken automatically through authentication protocol for authorization and authentication 504. At sequence 1.1 of the sequence diagram 500, the authentication module 416 may indicate that the user 502 has been authenticated and authorized to user the application dashboard 506.

According to exemplary embodiments, at sequence 2, of the sequence diagram 500 implemented by the PLAAM 406, an application dashboard 506 is displayed of GUI 432. At sequence 3, the user may click on "About Application" from the menu. At sequence 3.1, a quick demo of the application, problem statement and how this application solves it, advantages, etc., are mentioned, but the disclosure is not limited thereto.

According to exemplary embodiments, at sequence 4 of the sequence diagram 500 implemented by the PLAAM 406, the user 502 may click on "Onboard Application" from the menu. At sequence 4.1, the PLAAM 406 may be configured to implement all control to the "Onboard Application" Page (i.e., Onboard Application 508). At sequence 4.1.1, the "Onboard Application" page is displayed to the user 502 via the GUI 432 with first page asking to enter application, environments, server level details, etc., but the disclosure is not limited thereto. At sequence 4.1.1.1, the user 502 may enter application name, environments, platform, server, app owner and other details and may navigate to the next page. At sequence 4.1.2, the next page is displayed to the user 502 via the GUI 432 where modules or components within the application can be created. At sequence 4.1.2.1, the user 502 may click on create module button, feed the input data that should be fed to that module or component, expected output and health check URLs of the module or component and follow this approach to create x modules or components and submit when done with creation of modules or components. At sequence 4.1.3, the next page is displayed asking for details related to external client apps information which have dependencies with the created applications or modules or components. At sequence 4.1.3.1, the user 502 may enter the required details and may click on "submit" icon which on-boards the application to application dashboard 506.

According to exemplary embodiments, at sequence 5 of the sequence diagram 500 implemented by the PLAAM 406, the application dashboard 506 displays the onboard application 508 on which the user 502 provide inputs for automatically performing testing operations or adding other users to access the onboard application 508 or editing it or deleting it, etc., but the disclosure is not limited thereto.

According to exemplary embodiments, at sequence 6 of the sequence diagram 500 implemented by the PLAAM 406, the user 502 can also click on frequently asked questions (FAQs) tab from a menu displayed on application dashboard 506. At sequence 6.1, a page with general FAQs and user asked questions along with any discussion thread and approved answer is displayed via the GUI 432. At sequence 6.2, the user 502 can also ask his/her own question, thereby starting a discussion thread for getting the question answered.

Figure 6A:
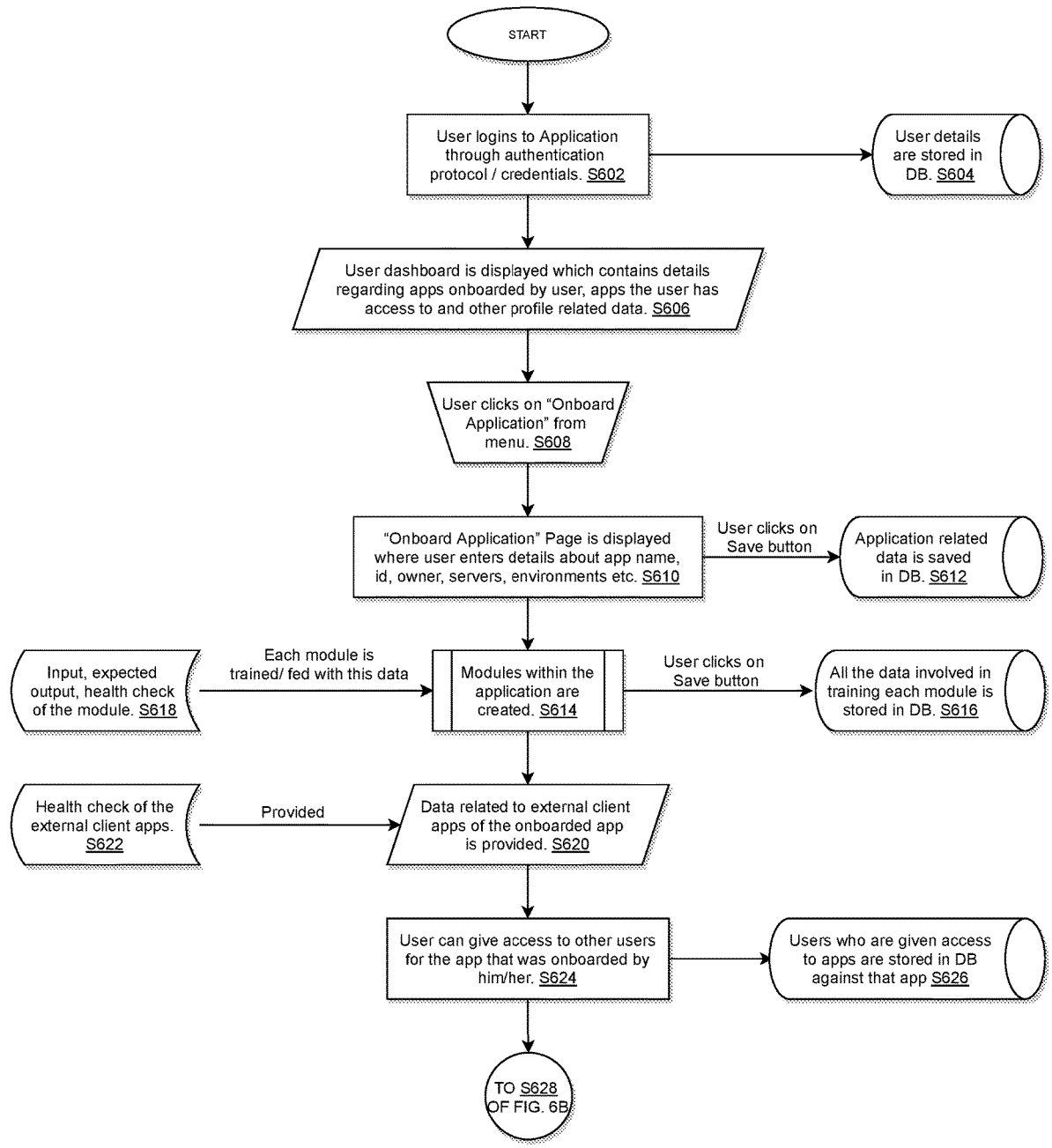
FIG. 6A and FIG. 6B, in combination, illustrates a flow chart implemented by the platform and language agnostic application module of FIG. 4 in accordance with an exemplary embodiment.
Figure 6B:
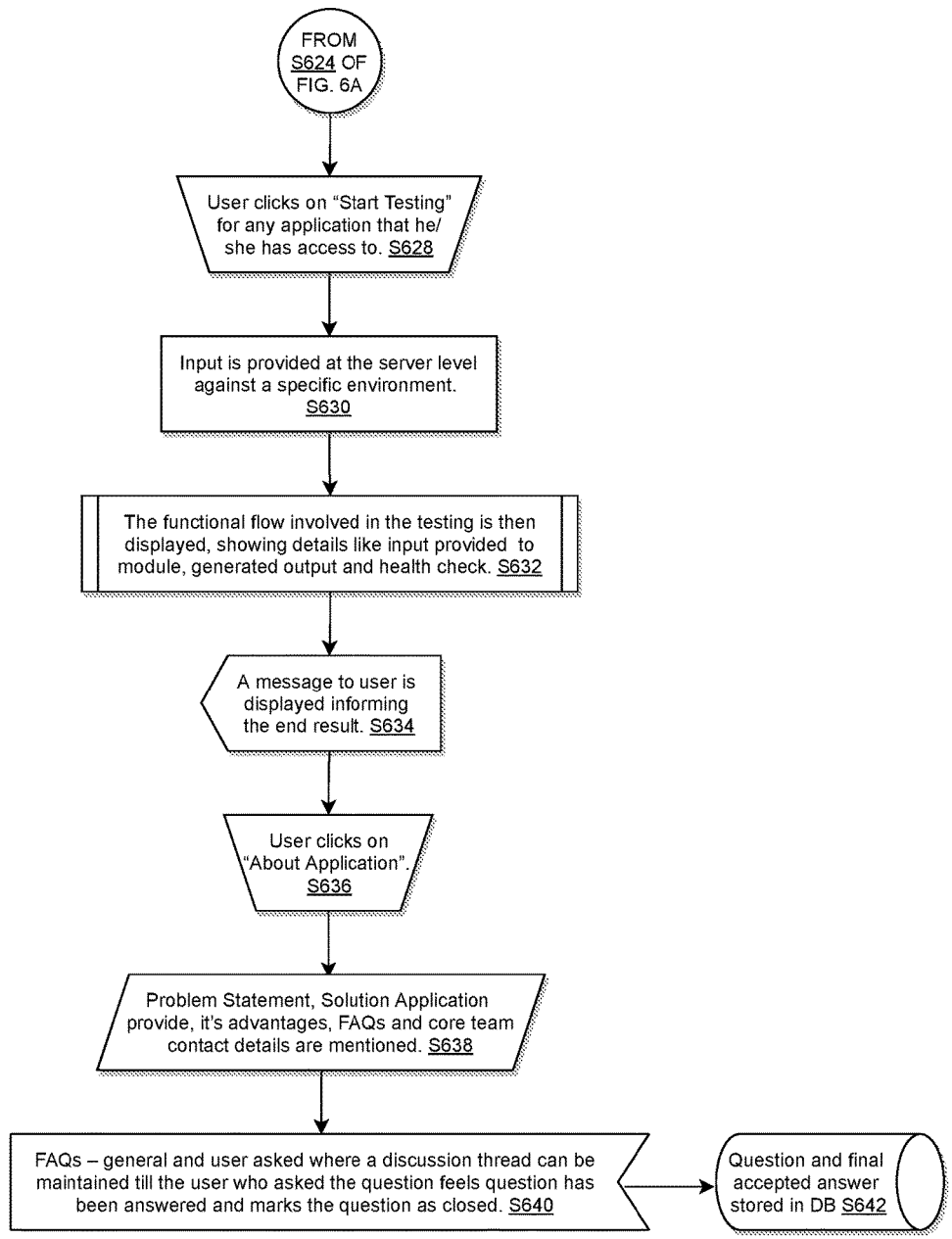

FIG. 6A and FIG. 6B, in combination, illustrates a flow chart 600 implemented by the PLAAM 406 of FIG. 4 in accordance with an exemplary embodiment. It will be appreciated that the illustrated process 700 and associated steps may be performed in a different order, with illustrated steps omitted, with additional steps added, or with a combination of reordered, combined, omitted, or additional steps.

At step S602, user may login to an application through authentication protocol or credentials. At step S604, user details may be stored onto a database. At step S606, user dashboard may be displayed which may contains details regarding applications on-boarded by a user, applications the user has access to and other profile related data. At step S608, the user may click on "onboard application" from a menu. At step S610, "Onboard Application" Page is displayed where user enters details about application name, id, owner, servers, environments, etc., but the disclosure is not limited thereto. At step S612, application related data is saved onto a database.

According to exemplary embodiments, at step S614, modules or components within the application are created. At step S616, each module or component is trained or fed with data related to input, expected output, health check of the module or component. At step S618, all data involved in training each module or component is stored in database. At step S620, data related to external client application of the on-boarded application is provided. At step S622, health check data of the external client applications are provided. At step S624, a user may give access to other users for the application that was on-boarded by him or her. At step S626, users' information who are given access to the application is stored in the database against that application.

According to exemplary embodiments, at step S628, a user can click on "Start Testing" icon (not shown) for any application that he/she has access to. At step S630, input is provided at the server level (e.g., Kubernetes platform, Linux, etc., but the disclosure is not limited thereto) against a specific environment. At step S632, the functional flow involved in the testing is then displayed, showing details, e.g., input provided to module or component, generated output and health check, etc., but the disclosure is not limited thereto. At step S634, a message to user is displayed informing the end result. At step S636, a user may click on "about application" icon (not shown). At step S638, problem statement, solutions the application provides, its advantages, FAQs and core team contact details are displayed on a GUI. At step S640, FAQs may be displayed wherein FAQs may include general and user asked questions where a discussion thread can be maintained till the user who asked the question feels question has been answered and marks the question as closed. At step S642, question and final accepted answer are stored onto a database.

According to exemplary embodiments, referring back to FIGS. 4, 5, 6A, and 6B, the PLAAM 406 may be configured to set a corresponding predetermined threshold value for health of each corresponding module or component of an application required for running the application. According to exemplary embodiments, the PLAAM 406 may be configured to constantly monitor health of the plurality of components of an application. When it is determined by the PLAAM 406, in response to constantly monitoring, that the health of a certain component has reached to a value that is equal to the corresponding predetermined threshold value of the certain component, the PLAAM 406 may automatically call corresponding application programming interface (API) to trigger the following automated processes to: collect all necessary data corresponding to fixing of the health of the certain component (i.e., memory capacity of an application; memory utilization beyond a certain predetermined threshold may cause the application to crash, impacting other applications, etc., but the disclosure is not limited thereto) related to the application from a plurality of data sources; create a data file on demand that includes the necessary data; and automatically fix the health of the certain component based on the data file. However, the disclosure is not limited to the memory capacity scenario use case example as disclosed above. The PLAAM 406 may be configured to handle any system/application faults regardless of platform or language without departing from the scope of the present disclosure.

According to exemplary embodiments, the creating module 422 may be configured to create a data file in any one of the following file formats: .json, .xml, and .yml, but the disclosure is not limited thereto.

According to exemplary embodiments, in constantly monitoring health of the plurality of components modules of the application, the PLAAM 406 may be further configured to: access data from the application dashboard 506 that allows real-time monitoring of the application; access data from the suite of network management tools that allows monitoring of heterogeneous networks corresponding to running of the application; access data from a central location hub that aggregates all data feeds with emergency information from various data sources to the central location hub corresponding to running of the application; and access data from an event workflow platform within the application dashboard 506 related to running of the application.

According to exemplary embodiments, the PLAAM 506 may automatically call corresponding API to trigger the automated processes of fixing the health of the component or module disclosed above.

According to exemplary embodiments, in integrating output data from the application dashboard 506 and storing onto a database, the PLAAM 406 may be configured to access a plurality of private clouds, distributed operating systems, databases, event workflow platform, open source platform, etc., configured for allowing users to seamlessly connect, manage and secure networks of different microservices regardless of platform, source or vendor, but the disclosure is not limited thereto.

Figure 7:
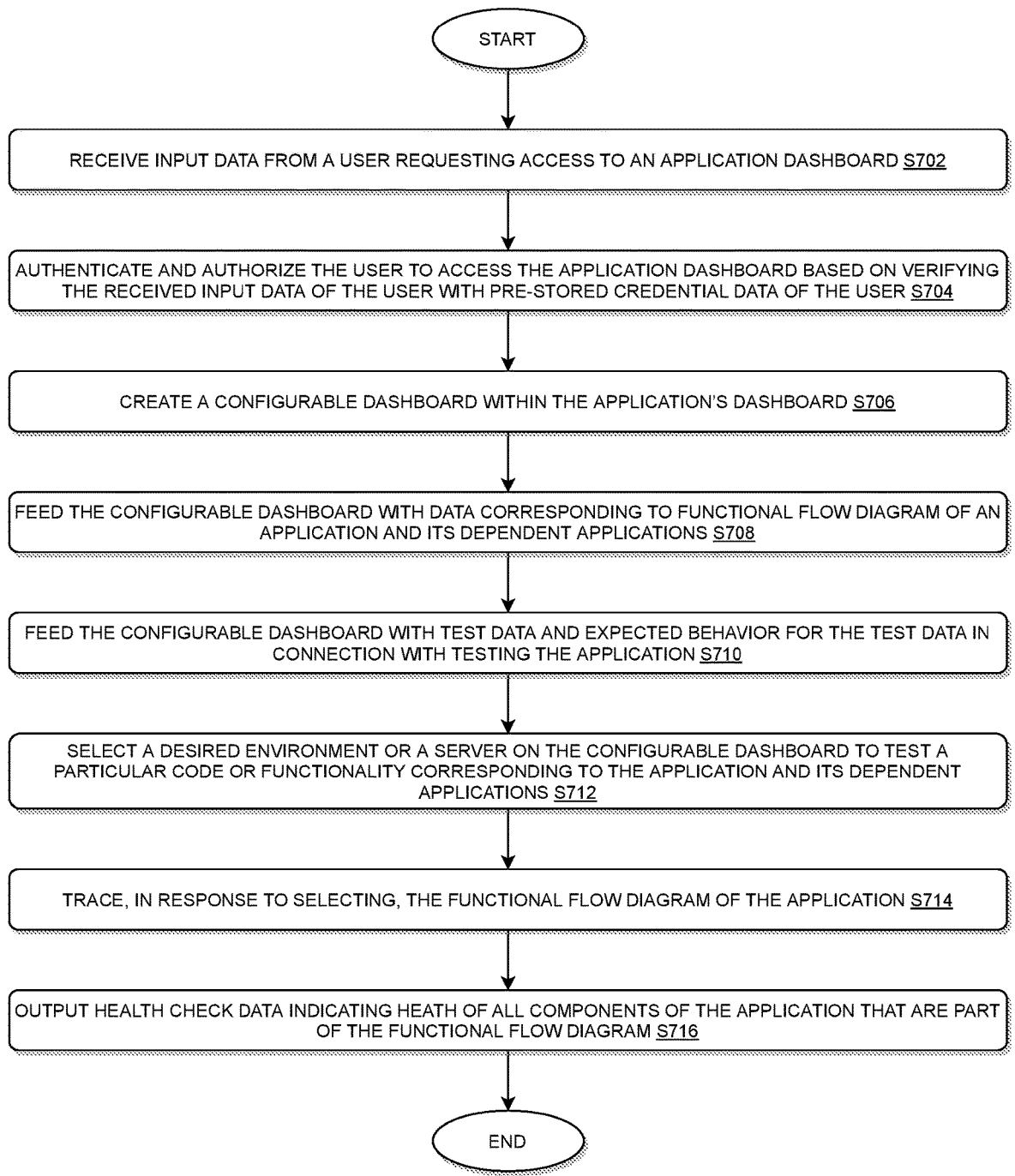
FIG. 7 illustrates a flow chart for implementing a platform and language agnostic application module/tool/framework for creating a dashboard within a dashboard configured for automating development and testing of suite of applications in accordance with an exemplary embodiment.

FIG. 7 illustrates a flow chart of a process 700 for implementing the PLAAM 406 that provides a platform for creating a dashboard within a dashboard configured for automating development and testing of suite of applications. It will be appreciated that the illustrated process 700 and associated steps may be performed in a different order, with illustrated steps omitted, with additional steps added, or with a combination of reordered, combined, omitted, or additional steps.

As illustrated in FIG. 7, at step S702, the process 700 may include receiving input data from a user requesting access to an application dashboard.

At step S704, the process 700 may include authenticating and authorizing the user to access the application dashboard based on verifying the received input data of the user with pre-stored credential data of the user.

At step S706, the process 700 may include creating a configurable dashboard within the application's dashboard.

At step S708, the process 700 may include feeding the configurable dashboard with data corresponding to functional flow diagram of an application and its dependent applications.

At step S710, the process 700 may include feeding the configurable dashboard with test data and expected behavior for the test data in connection with testing the application.

At step S712, the process 700 may include selecting a desired environment or a server on the configurable dashboard to test a particular code or functionality corresponding to the application and its dependent applications.

At step S714, the process 700 may include tracing, in response to selecting, the functional flow diagram of the application.

At step S716, the process 700 may include outputting health check data indicating heath of all components of the application that are part of the functional flow diagram.

According to exemplary embodiments, the process 700 may further include automatically testing each component of the application based on the test data and the functional flow diagram.

According to exemplary embodiments, in the process 700, the dependent applications are external dependent applications external to the application dashboard with respect to the application, but the disclosure is not limited thereto.

According to exemplary embodiments, the process 700 may further include: receiving user input corresponding to application name, environments, platform, server, and application owner via the application dashboard; displaying a create module button onto a graphical user interface; and automatically creating modules or components within the application when pressing signal on the create module button is received.

According to exemplary embodiments, the process 700 may include displaying expected output and health check uniform resource locators of the modules or components onto the graphical user interface.

According to exemplary embodiments, the process 700 may include displaying, onto a graphical user interface, corresponding fields to receive user input corresponding to details related to external client application information which have dependencies with the created applications or modules or components.

According to exemplary embodiments, the process 700 may include: displaying, onto a graphical user interface, frequently asked questions that include general and user asked questions where a discussion thread is maintained till the user who asked the question determines that the question has been answered and marks the question as closed.

According to exemplary embodiments, the PLAAD 402 may include a memory (e.g., a memory 106 as illustrated in FIG. 1) which may be a non-transitory computer readable medium that may be configured to store instructions for implementing a PLAAM 406 for automatically fixing health of a certain component of an application as disclosed herein. The PLAAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the PLAAM 406, 506 or within the PLAAD 402, may be used to perform one or more of the methods and processes as described herein. In a particular embodiment, the instructions may reside completely, or at least partially, within the memory 106, the medium reader 112, and/or the processor 104 (see FIG. 1) during execution by the PLAAD 402.

According to exemplary embodiments, the instructions, when executed, may cause a processor embedded within the PLAAM 406 or the PLAAD 402 to perform the following: receiving input data from a user requesting access to an application dashboard; authenticating and authorizing user to access the application dashboard based on verifying the received input data of the user with pre-stored credential data of the user; creating a configurable dashboard within the application's dashboard; feeding the configurable dashboard with data corresponding to functional flow diagram of an application and its dependent applications; feeding the configurable dashboard with test data and expected behavior for the test data in connection with testing the application; selecting a desired environment or a server on the configurable dashboard to test a particular code or functionality corresponding to the application and its dependent applications; tracing, in response to selecting, the functional flow diagram of the application; and providing health check data indicating heath of all components of the application that are part of the functional flow diagram. The processor may be the same or similar to the processor 104 as illustrated in FIG. 1 or the processor embedded within PLAAD 202, PLAAD 302, PLAAD 402, and PLAAM 406, 506.

According to exemplary embodiments, the instructions, when executed, may further cause the processor 104 to perform the following: automatically testing each component of the application based on the test data and the functional flow diagram.

According to exemplary embodiments, the instructions, when executed, may further cause the processor 104 to perform the following: receiving user input corresponding to application name, environments, platform, server, and application owner via the application dashboard; displaying a create module button onto a graphical user interface; and automatically creating modules or components within the application when pressing signal on the create module button is received.

According to exemplary embodiments, the instructions, when executed, may further cause the processor 104 to perform the following: displaying expected output and health check uniform resource locators of the modules or components onto the graphical user interface.

According to exemplary embodiments, the instructions, when executed, may further cause the processor 104 to perform the following: displaying, onto a graphical user interface, corresponding fields to receive user input corresponding to details related to external client application information which have dependencies with the created applications or modules or components.

According to exemplary embodiments, the instructions, when executed, may further cause the processor 104 to perform the following: displaying, onto a graphical user interface, frequently asked questions that include general and user asked questions where a discussion thread is maintained till the user who asked the question determines that the question has been answered and marks the question as closed.

According to exemplary embodiments as disclosed above in FIGS. 1-7, technical improvements effected by the instant disclosure may include a platform for implementing a platform and language agnostic application module/tool/framework for creating a dashboard within a dashboard configured for: providing an end-to-end functional flow of an application even before development which would avoid potential bugs; providing information data related to the information on clients or modules or components that would be impacted when a piece of functionality is updated or added in a module within an application helping in testing of the impacted applications; providing a transparent process where input provided to the module, health check of the module, outcome obtained from the module would all be mentioned, thereby helping in faster identification of potential bugs if any issues arise; automating the development and testing processes, etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for checking health of a certain component of an application by utilizing one or more processors and one or more memories, the method comprising:
    receiving input data from a user requesting access to an application dashboard;
    authenticating and authorizing the user to access the application dashboard based on verifying the received input data of the user with pre-stored credential data of the user;
    creating a configurable dashboard within the application's dashboard;
    feeding the configurable dashboard with data corresponding to a functional flow diagram of an application and its dependent applications;
    feeding the configurable dashboard with test data and expected behavior for the test data in connection with testing the application;
    selecting a desired environment or a server on the configurable dashboard to test a particular code or functionality corresponding to the application and its dependent applications;
    tracing, in response to selecting, the functional flow diagram of the application; and
    providing health check data indicating heath of all components of the application that are part of the functional flow diagram.

2. The method according to claim 1, further comprising:
    automatically testing each component of the application based on the test data and the functional flow diagram.

3. The method according to claim 1, wherein the dependent applications are external dependent applications external to the application dashboard with respect to the application.

4. The method according to claim 1, further comprising:
    receiving user input corresponding to application name, environments, platform, server, and application owner via the application dashboard;
    displaying a create module button onto a graphical user interface; and
    automatically creating modules or components within the application when pressing signal on the create module button is received.

5. The method according to claim 4, further comprising:
    displaying expected output and health check uniform resource locators of the modules or components onto the graphical user interface.

6. The method according to claim 1, further comprising:
    displaying, onto a graphical user interface, corresponding fields to receive user input corresponding to details related to external client application information which have dependencies with the created applications or modules or components.

7. The method according to claim 1, further comprising:
    displaying, onto a graphical user interface, frequently asked questions that include general and user asked questions where a discussion thread is maintained till the user who asked the question determines that the question has been answered and marks the question as closed.

8. A system for checking health of a certain component of an application, the system comprising:
a processor; and
a memory operatively connected to the processor via a communication interface, the memory storing computer readable instructions, when executed, causes the processor to:
receive input data from a user requesting access to an application dashboard;
authenticate and authorize the user to access the application dashboard based on verifying the received input data of the user with pre-stored credential data of the user;
create a configurable dashboard within the application's dashboard;
feed the configurable dashboard with data corresponding to a functional flow diagram of an application and its dependent applications;
feed the configurable dashboard with test data and expected behavior for the test data in connection with testing the application;
select a desired environment or a server on the configurable dashboard to test a particular code or functionality corresponding to the application and its dependent applications;
trace, in response to selecting, the functional flow diagram of the application; and
provide health check data indicating heath of all components of the application that are part of the functional flow diagram.

9. The system according to claim 8, wherein the processor is further configured to:
automatically test each component of the application based on the test data and the functional flow diagram.

10. The system according to claim 8, wherein the dependent applications are external dependent applications external to the application dashboard with respect to the application.

11. The system according to claim 8, wherein the processor is further configured to:
receive user input corresponding to application name, environments, platform, server, and application owner via the application dashboard;
display a create module button onto a graphical user interface; and
automatically create modules or components within the application when pressing signal on the create module button is received.

12. The system according to claim 11, wherein the processor is further configured to:
display expected output and health check uniform resource locators of the modules or components onto the graphical user interface.

13. The system according to claim 8, wherein the processor is further configured to:
display, onto a graphical user interface, corresponding fields to receive user input corresponding to details related to external client application information which have dependencies with the created applications or modules or components.

14. The system according to claim 8, wherein the processor is further configured to:
display, onto a graphical user interface, frequently asked questions that include general and user asked questions where a discussion thread is maintained till the user who asked the question determines that the question has been answered and marks the question as closed.

15. A computer readable hardware storage device that permanently stores instructions for checking health of a certain component of an application, wherein, when executed, the instructions cause a processor to perform the following: receiving input data from a user requesting access to an application dashboard; authenticating and authorizing the user to access the application dashboard based on verifying the received input data of the user with pre-stored credential data of the user; creating a configurable dashboard within the application's dashboard; feeding the configurable dashboard with data corresponding to a functional flow diagram of an application and its dependent applications; feeding the configurable dashboard with test data and expected behavior for the test data in connection with testing the application; selecting a desired environment or a server on the configurable dashboard to test a particular code or functionality corresponding to the application and its dependent applications; tracing, in response to selecting, the functional flow diagram of the application; and providing health check data indicating heath of all components of the application that are part of the functional flow diagram.

16. The computer readable hardware storage device according to claim 15, wherein, when executed, the instructions further cause the processor to perform the following: automatically testing each component of the application based on the test data and the functional flow diagram.

17. The computer readable hardware storage device according to claim 15, wherein the dependent applications are external dependent applications external to the application dashboard with respect to the application.

18. The computer readable hardware storage device according to claim 15, wherein, when executed, the instructions further cause the processor to perform the following: receiving user input corresponding to application name, environments, platform, server, and application owner via the application dashboard; displaying a create module button onto a graphical user interface; and automatically creating modules or components within the application when pressing signal on the create module button is received.

19. The computer readable hardware storage device according to claim 18, wherein, when executed, the instructions further cause the processor to perform the following: displaying expected output and health check uniform resource locators of the modules or components onto the graphical user interface.

20. The computer readable hardware storage device according to claim 15, wherein, when executed, the instructions further cause the processor to perform the following: displaying, onto a graphical user interface, corresponding fields to receive user input corresponding to details related to external client application information which have dependencies with the created applications or modules or components; and displaying, onto the graphical user interface, frequently asked questions that include general and user asked questions where a discussion thread is maintained till the user who asked the question determines that the question has been answered and marks the question as closed.

* * * * *